R. MALCOM.
EYE PROTECTOR.
APPLICATION FILED DEC. 23, 1918.
1,328,287.
Patented Jan. 20, 1920.
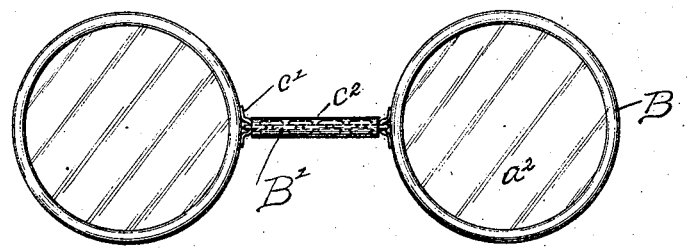
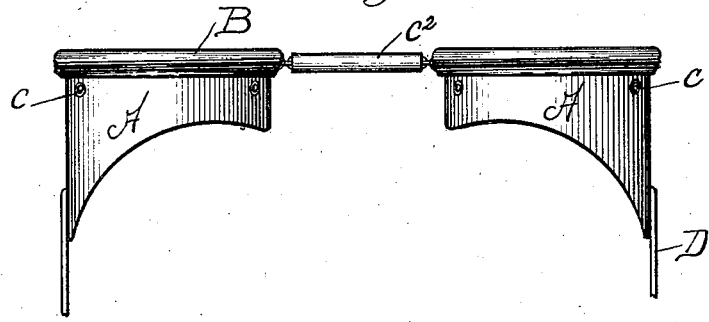
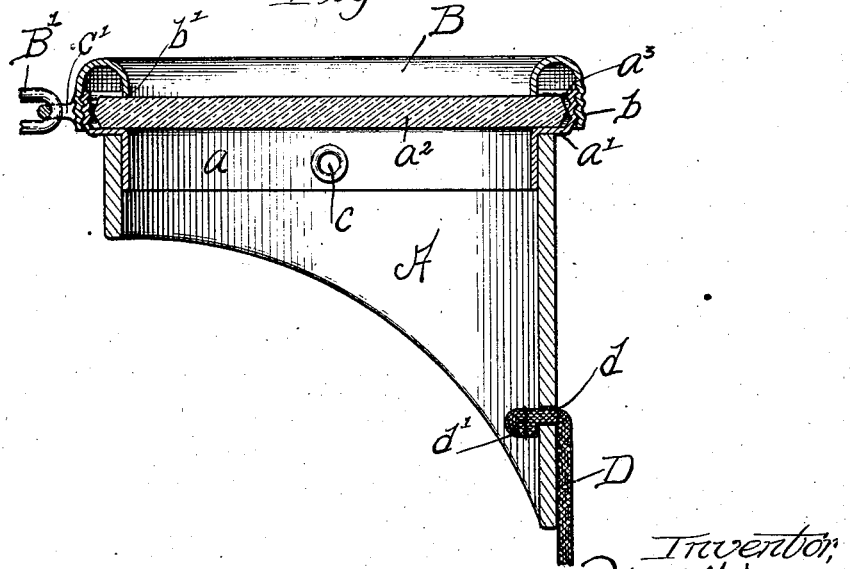
Inventor,
Robert Malcom.

UNITED STATES PATENT OFFICE.

ROBERT MALCOM, OF CHICAGO, ILLINOIS.

EYE-PROTECTOR.

1,328,287.

Specification of Letters Patent.

Patented Jan. 20, 1920.

Application filed December 23, 1918. Serial No. 267,909.

*To all whom it may concern:*

Be it known that I, ROBERT MALCOM, a citizen of the United States, residing at Chicago, county of Cook, State of Illinois, have invented certain new and useful Improvements in Eye-Protectors, of which the following, taken in connection with the drawings, is a description.

My invention has for its object the production of an eye protector, or pair of goggles, designed to be worn by workmen who are exposed to the elements, or those who work in places where there is much dust, cinders, etc., in the air.

A further object of the invention is to provide a device of this kind, having means for quickly, and easily removing the lenses in case of breakage, or if it is desired to change the lenses for any other reason.

A further object of the invention is to provide an eye protector which is inexpensive, strong and durable, and which is constructed of material which can be easily cleansed and made sanitary after being worn.

In the accompanying drawings, I have illustrated what I now consider the preferred form of my invention, although I contemplate changes in size and proportions of the parts, and such changes as may come within the scope of the appended claims.

In the drawings,

Figure 1 is a front elevation of my eye protector;

Fig. 2 is a side elevation of same; and

Fig. 3 is an enlarged sectional view taken through the center of the eye cups and lens frame;

Referring to the drawings, A represents an eye cup circular in form and having one side thereof elongated diagonally to the axis thereof. This eye cup is preferably made of fiber, although other material, such as metal, rubber, or the like, may be used, if desired.

Fitted inside of the circular end of this eye cup is a lens holding rim which is formed of metal, having a ring $a$ held in place by frictional engagement with the cup. This ring $a$ is provided with an outwardly extending shoulder $a^1$ which rests upon the edge or end of the eye cup, and upon which shoulder the glass or lens $a^2$ rests when in position. An outer rim $a^3$ is formed upon the shoulder $a^1$, extends at right angles thereto, and is provided with screw threads extending circumferentially thereof.

A retaining frame B, which is approximately semi-circular in cross-section, has its sides $b$ provided with threads extending over the screw-threaded rim $a^3$ and is turned into engagement therewith.

As this retaining rim is secured into position, the opposite edge $b^1$ of the semi-circular retaining rim B bears upon the surface of the lens $a^2$ and holds the same securely in position.

Through the wall of the eye cup A and the lens holding rim $a$ are coincident openings $c$ which provide means for ventilation. These openings may or may not be secured in place by an eyelet which engages both the wall of the eye cup and lens holding ring.

A flexible bridge or nose piece is provided for these goggles by a chain $B^1$, which is connected to each of the retaining rims B, in any suitable manner, such as the loop $c^1$. A sleeve $c^2$, preferably, of rubber or other resilient material fits over the chain $B^1$.

Through the wall of the elongated opening of each eye cup is provided an opening $d$ through which a head band D is secured for the purpose of holding the goggles in place upon the head of the wearer. This head band is preferably an elastic member and is bent or folded at the ends thereof to form a hem $d^1$ which will not pass through the opening $d$ thereby forming a securing means between the eye cup and head band.

I claim:

1. An eye protector, comprising a pair of eye cups, one end of which is circular and the other elongated on a line diagonal to the axis thereof, a lens retaining ring secured in one end of each eye cup and held in position by frictional engagement therewith, said ring being provided with an outwardly extending shoulder abutting against the end of the eye cup, and means for holding the lens in each of said rings.

2. An eye protector, comprising lenses, a pair of eye cups, one end of each of which is circular and the other elongated on a line diagonal to the axis thereof, a lens retaining ring held in each eye cup by frictional engagement therewith, a semi-circular retaining ring, having one edge thereof engaging the aforesaid ring and the opposite edge engaging the lens in each eye cup, 3. An eye protector, comprising lenses, a pair of eye cups and lens retaining rings secured in each eye cup, said ring having an outwardly extending shoulder which abuts the aforesaid ends of each eye cup, a screw threaded portion on each side of said eye cups in which the lens is positioned, a semi-circular retaining rim having one edge engaging the screw threaded portion of the ring and the other edge bearing against the lens.

4. An eye-protector, comprising a pair of eye-cups, a lens ring in each eye-cup, said ring having a shoulder abutting the forward edge of the eye-cup and forming a seat for the lens, retaining members having engagement with said lens rings to secure the lenses in place, a flexible nose piece connecting said eye cups, and a flexible sleeve inclosing said nose piece.

5. An eye protector, comprising lenses, a pair of eye cups, lens rings secured in said eye cups, each of said rings having a circumferential shoulder abutting the forward edge of the eye-cup, retaining members having engagement with said lens rings to hold the lenses in place, a flexible nose piece connecting said eye-cups, and a head band one end of which is removably secured to each of the eye-cups.

In testimony whereof I have signed this specification.

ROBERT MALCOM.